(12) United States Patent
Doerr et al.

(10) Patent No.: US 9,435,959 B2
(45) Date of Patent: Sep. 6, 2016

(54) COUPLING OF FIBER OPTICS TO PLANAR GRATING COUPLERS

(71) Applicant: Acacia Communications Inc., Maynard, MA (US)

(72) Inventors: Christopher Doerr, Middleton, NJ (US); Eric Swanson, Gloucester, MA (US)

(73) Assignee: Acacia Communications, Inc., Maynard, MA (US)

(*) Notice: Subject to any disclaimer, the term of this patent is extended or adjusted under 35 U.S.C. 154(b) by 0 days.

(21) Appl. No.: 13/871,320

(22) Filed: Apr. 26, 2013

(65) Prior Publication Data

US 2014/0147079 A1 May 29, 2014

Related U.S. Application Data

(60) Provisional application No. 61/638,647, filed on Apr. 26, 2012.

(51) Int. Cl.
| | |
|---|---|
| *G02B 6/30* | (2006.01) |
| *G02B 6/34* | (2006.01) |
| *G02B 6/42* | (2006.01) |
| *G02B 6/43* | (2006.01) |
| *G02B 6/26* | (2006.01) |
| *G02B 6/293* | (2006.01) |
| *G02B 6/36* | (2006.01) |

(52) U.S. Cl.
CPC ................ *G02B 6/30* (2013.01); *G02B 6/262* (2013.01); *G02B 6/29311* (2013.01); *G02B 6/34* (2013.01); *G02B 6/4214* (2013.01); *G02B 6/43* (2013.01); *G02B 6/3636* (2013.01); *G02B 6/4269* (2013.01)

(58) Field of Classification Search
USPC .......................................................... 385/38
See application file for complete search history.

(56) References Cited

U.S. PATENT DOCUMENTS

| | | | |
|---|---|---|---|
| 4,776,661 A | 10/1988 | Handa | |
| 4,869,568 A | 9/1989 | Schimpe | |
| 5,146,518 A | 9/1992 | Mak et al. | |
| 5,163,113 A * | 11/1992 | Melman ............... | G02B 6/4202 385/31 |
| 5,208,800 A | 5/1993 | Isobe et al. | |
| 5,420,947 A | 5/1995 | Li et al. | |
| 5,581,642 A | 12/1996 | Deacon et al. | |
| 5,664,032 A | 9/1997 | Bischel et al. | |
| 5,790,730 A | 8/1998 | Kravitz et al. | |
| 6,198,860 B1 | 3/2001 | Johnson et al. | |
| 6,259,841 B1 | 7/2001 | Bhagavatula | |
| 6,310,991 B1 | 10/2001 | Koops et al. | |
| 6,445,939 B1 | 9/2002 | Swanson et al. | |
| 6,542,682 B2 | 4/2003 | Cotteverte et al. | |
| 6,640,034 B1 | 10/2003 | Charlton et al. | |
| 6,768,834 B1 | 7/2004 | Gruhlke | |
| 6,792,178 B1 * | 9/2004 | Zhou .................... | G02B 6/4214 385/31 |
| 7,006,734 B2 | 2/2006 | Zheng et al. | |
| 7,065,272 B2 | 6/2006 | Taillaert et al. | |
| 7,162,124 B1 * | 1/2007 | Gunn et al. ..................... | 385/37 |
| 7,245,803 B2 * | 7/2007 | Gunn et al. ..................... | 385/37 |
| 7,298,945 B2 | 11/2007 | Gunn, III et al. | |
| 8,064,745 B2 * | 11/2011 | Fortusini et al. ............... | 385/37 |
| 8,961,037 B2 * | 2/2015 | Nishimura ........... | G02B 6/4214 385/88 |
| 2003/0165291 A1 * | 9/2003 | Bhagavatula et al. .......... | 385/33 |
| 2010/0253949 A1 * | 10/2010 | Adler et al. ................... | 356/479 |
| 2013/0209026 A1 * | 8/2013 | Doany et al. ................... | 385/14 |

* cited by examiner

*Primary Examiner* — Michelle R Connelly

(74) *Attorney, Agent, or Firm* — Wolf, Greenfield & Sacks, P.C.

(57) ABSTRACT

Techniques, methods, structures and apparatus that provide the efficient coupling of light to/from one or more optical fibers to/from planar grating waveguide couplers positioned on photonic integrated circuits.

20 Claims, 11 Drawing Sheets

COUPLING OF FIBER OPTICS TO PLANAR GRATING COUPLERS

CROSS REFERENCE TO RELATED APPLICATIONS

This application claims the benefit of U.S. Provisional Patent Application Ser. No. 61/638,647 filed Apr. 26, 2012 which is incorporated by reference in its entirety as if set forth at length herein.

TECHNICAL FIELD

This disclosure relates generally to the field of photonic integrated circuits and in particular to techniques, methods and apparatus pertaining to the efficient coupling of light from one or more optical fibers to or from planar grating waveguide couplers on photonic integrated circuits.

BACKGROUND

Contemporary optical communications and other systems oftentimes employ grating couplers to couple light to/from photonic integrated circuits via one or more optical fibers. Accordingly, methods, structures or techniques that improve the effectiveness of such coupling or resulting packaging of these structures would represent a welcome addition to the art.

SUMMARY

An advance in the art is made according to an aspect of the present disclosure directed to methods and structures for coupling light to and/or from surface 1-dimensional (1D) or 2-dimensional (2D) grating waveguide couplers to optical fibers.

Viewed from a first aspect, the present disclosure is directed to a structure including a single-mode optical fiber having an integrated lens and a folding optic that advantageously reduces resulting packaging height.

Viewed from another aspect, the present disclosure is directed to a grating exhibiting a chirped characteristic such that light is more efficiently coupled from an optical fiber in a diverging optical field.

Viewed from yet another aspect, the present disclosure is directed to a transponder module including a photonic integrated circuit having multiple surface grating couplers as part of a single optical mechanical assembly wherein multiple single mode fibers having integrated lenses are optically coupled thereto. A single turning mirror is employed to redirect the light toward a bottom of the assembly where it is focused onto or near the bottom. Advantageously, the transponder includes an application specific integrated circuit (ASIC), laser, and photonic integrated circuit having various electro-optical elements including multiple grating waveguide couplers.

BRIEF DESCRIPTION OF THE DRAWING

A more complete understanding of the present disclosure may be realized by reference to the accompanying drawings in which.

DETAILED DESCRIPTION

Figure 1:
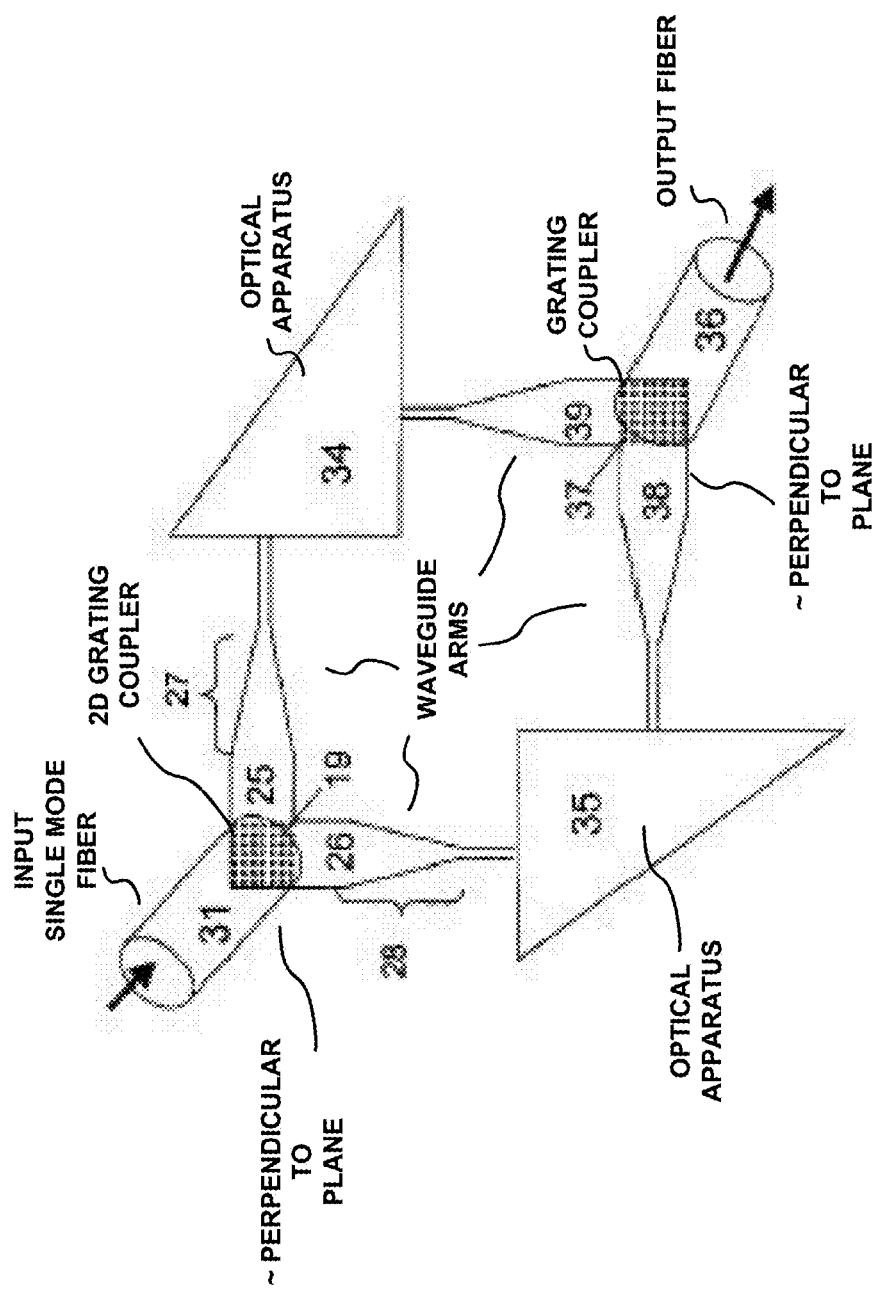
FIG. 1 shows a schematic prior-art configuration of a single mode fiber butt coupled to a 2D grating coupler.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, it is noted that planar waveguide surface 1D and 2D grating couplers have been known to be an effective mechanism to couple light to/or from a single mode optical fiber into/out-of surface waveguides on photonic integrated circuits. Known methods and techniques include individual single mode fibers butt coupled directly to grating couplers, or lens coupled, or coupled in diverging optical fields emanating from single mode fibers.

Additionally, techniques are known wherein a single-mode fiber is angle polished on a 45 degree angle and this polished facet is HR coated and positioned over a 2D grating coupler such that an overall height profile of the combined grating/fiber device is advantageously lowered. Notwithstanding these known techniques and structures—prior to the present disclosure—coupling one or more single mode optical fibers having an integrated lens in a low profile package while maintaining proper optical parameters at the surface of the grating remains elusive.

Turning now to FIG. 1, there it shows an example—as employed in the prior art—of a single mode fiber butt coupled to a 2D grating coupler. More particularly, FIG. 1 shows an input fiber butt coupled to a 2D grating coupler which couples light received from the input fiber into two input waveguide arms. Also shown in FIG. 1 is a complementary output fiber which outputs light coupled into that fiber through the effect of 2D grating coupler which receives light from output waveguide arms.

While not specifically shown in this schematic of FIG. 1, the input and output fibers are generally, substantially perpendicular to the plane of the waveguide arms, and the gratings. Those skilled in the art will readily understand and appreciate that such configurations require substantial package volume and particular dimensions and geometries to accommodate such input/output fiber orientations.

Figure 2:
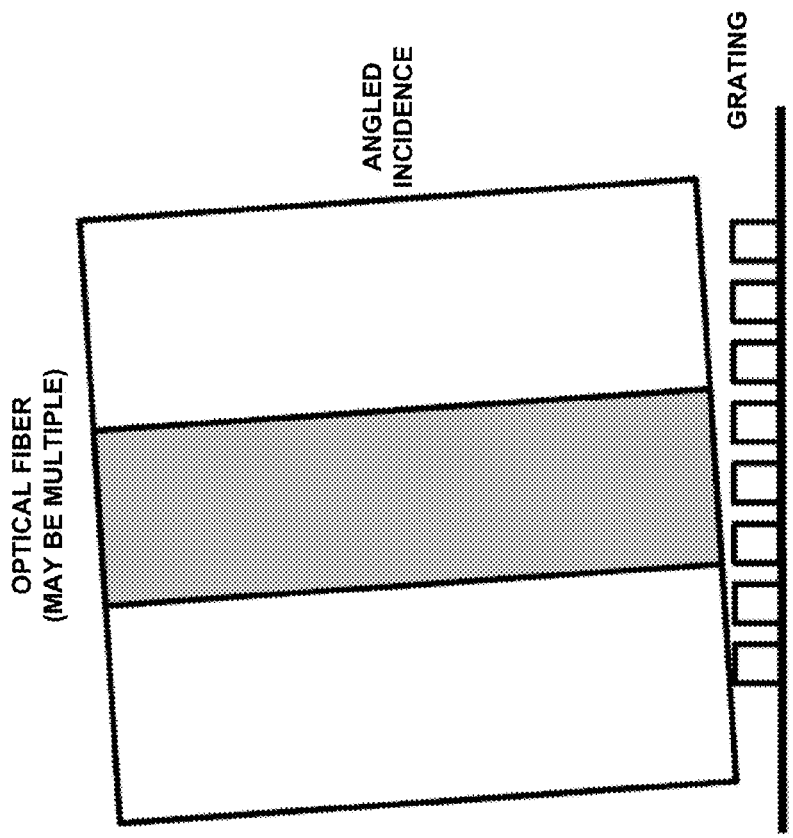
FIG. 2 shows a schematic prior-art configuration of a single mode fiber butt coupled at a slight angle to a 2D grating coupler.

As may be appreciated, the optical fibers such as those shown in FIG. 1 may exhibit a normal incidence (as shown) or angled relative to the grating as shown in FIG. 2. With reference to that FIG. 2, such angled orientations of an optical fiber relative to the surface of a grating permit the coupling of multiple fibers (such as the two shown in FIG. 2) to the single grating.

Figure 3:
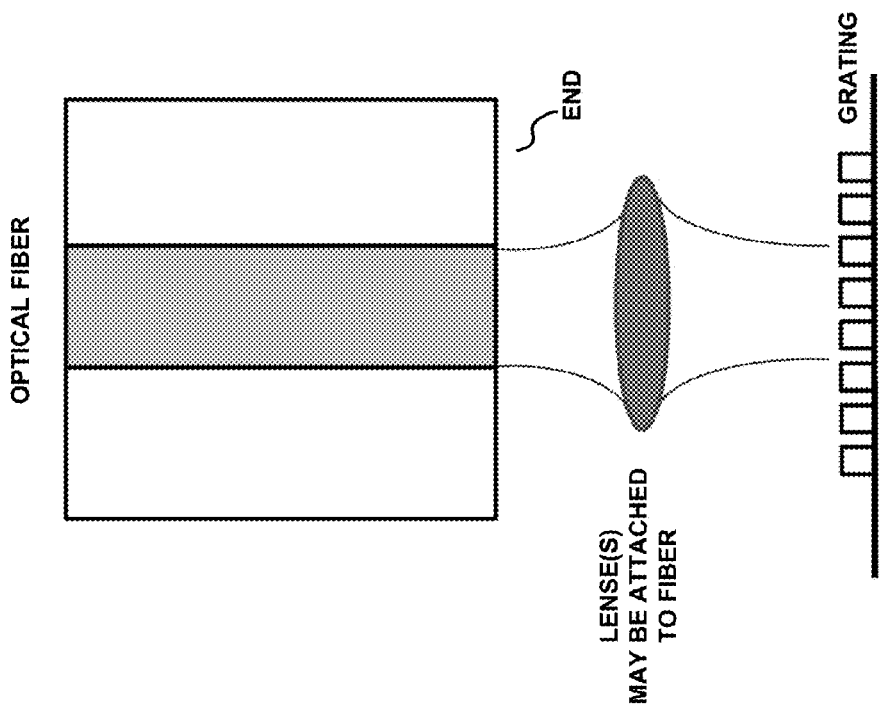
FIG. 3 shows a schematic configuration of a fiber coupled to a grating coupler using a lens according to an aspect of the present disclosure.

Configurations such as those shown in FIGS. 1 and 2, may be further developed/enhanced with additional optical elements. More particularly, FIG. 3 shows additional optical elements such as lenses that facilitate the coupling of light between an optical fiber and a waveguide grating coupler. In such configurations, the design of the grating coupler may be periodic and therefore efficiently couple light into waveguide arms. While not specifically shown in FIG. 3, there may be more than one individual lens associated with the configuration shown and any such lens(es) may be affixed to the end of the optical fiber—or not.

According to aspects of the present disclosure, there are numerous advantages of using optical fibers having a lens affixed to the end of the fiber or a separate lens when optically coupling an optical fiber to an optical grating as shown in FIG. 3. More specifically, by reducing the size of the waist (the narrowest point of the beam) of a beam emanating from the optical fiber and impinging upon the surface of the grating coupler, a wider optical bandwidth may be advantageously obtained as the bandwidth of the grating coupler is inversely proportional to its length.

Figure 4:
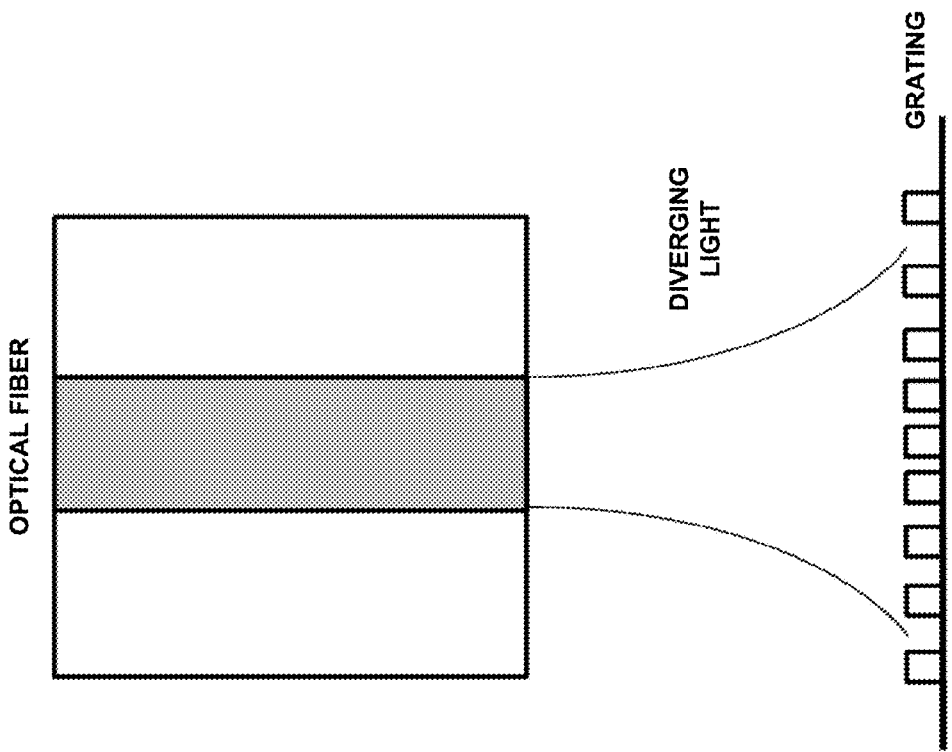
FIG. 4 shows a schematic configuration of a grating coupler in a diverging field of a single mode fiber with no lens or butt coupling according an aspect of the present disclosure.

Appreciably, if light emitted from a fiber facet such as that shown in FIG. 4 is not imaged onto a surface of a grating in a beam waist (the narrowest point of the beam), then the grating must be modified to efficiently couple the light. With continued reference to FIG. 4, it may be observed that light from the fiber facet is shown diverting as it impinges onto the surface of the grating. In such a case, the grating may be chirped to more efficiently couple light into horizontal waveguides in optical communication with the grating (not specifically shown).

Figure 5:
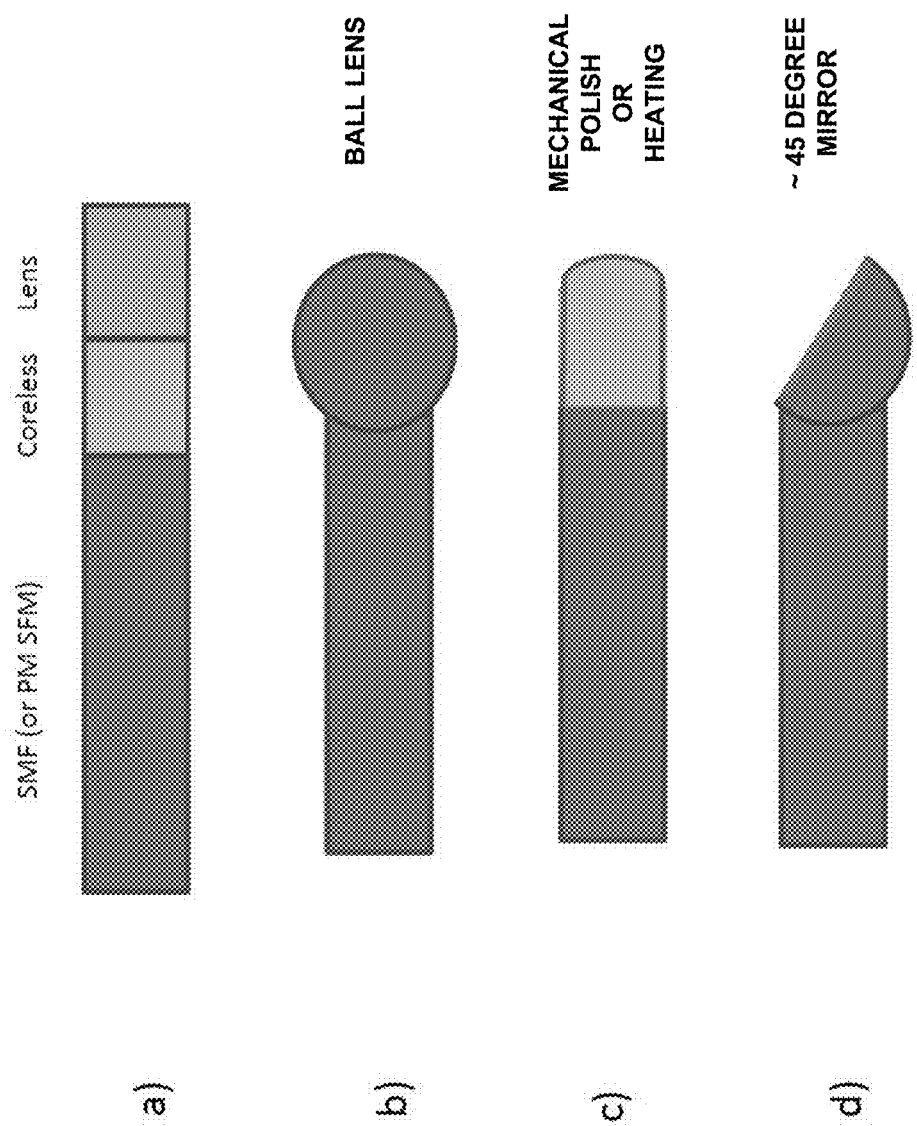
FIGS. 5(a)-(d) show four exemplary small lens configurations that may be affixed to a single mode fiber according to an aspect of the present disclosure.

With reference to FIGS. 5(a)-(d), it may be understood that a variety of lens structures may be affixed to the end of an optical fiber (i.e., single mode fiber) according to another aspect of the present disclosure. As may be appreciated, an advantage of such lens/optical fiber designs is that they are both compact and mechanically stable. More particularly FIG. 5(a) shows an example of a lens affixed to a length of coreless fiber and a length of graded index fiber. Such attachments configurations may be produced using known fusion splicer or other techniques.

FIG. 5(b) shows an example of a ball lens/optical fiber configuration which may advantageously formed using a fusion splicer. FIG. 5(c) shows yet another example of a lens/optical fiber combination that may be formed by mechanical polishing or heating the end of a section of coreless fiber—which may have been attached to a section of single mode fiber.

As may be appreciated, there exist a number of techniques for forming lenses on the end of single mode optical fiber as well as techniques useful to redirect light emanating from the end of optical fibers such that the light is substantially deviated from the axis of propagation along the optical fiber. One such example—shown schematically in FIG. 5(d), involves polishing the ball lens on the end of a structure such as that shown in FIG. 5(b), at substantially a 45 degree angle and then to coat the resulting flat surface with a high reflectance coating. Note that it is not always desirable to have the light redirected by a 45 degree surface (mirror) as beneficial properties of 1D and 2D gratings result when an optical input signal impinges such gratings at a tilt angle from normal incidence. And while we sometimes refer to a 45 degree mirror herein, those skilled in the art will appreciate that our teachings are not so limited. More particularly, even though we refer to a 45 degree mirror, our teachings should be interpreted to include angles that are other than 45 degrees.

Figure 6:
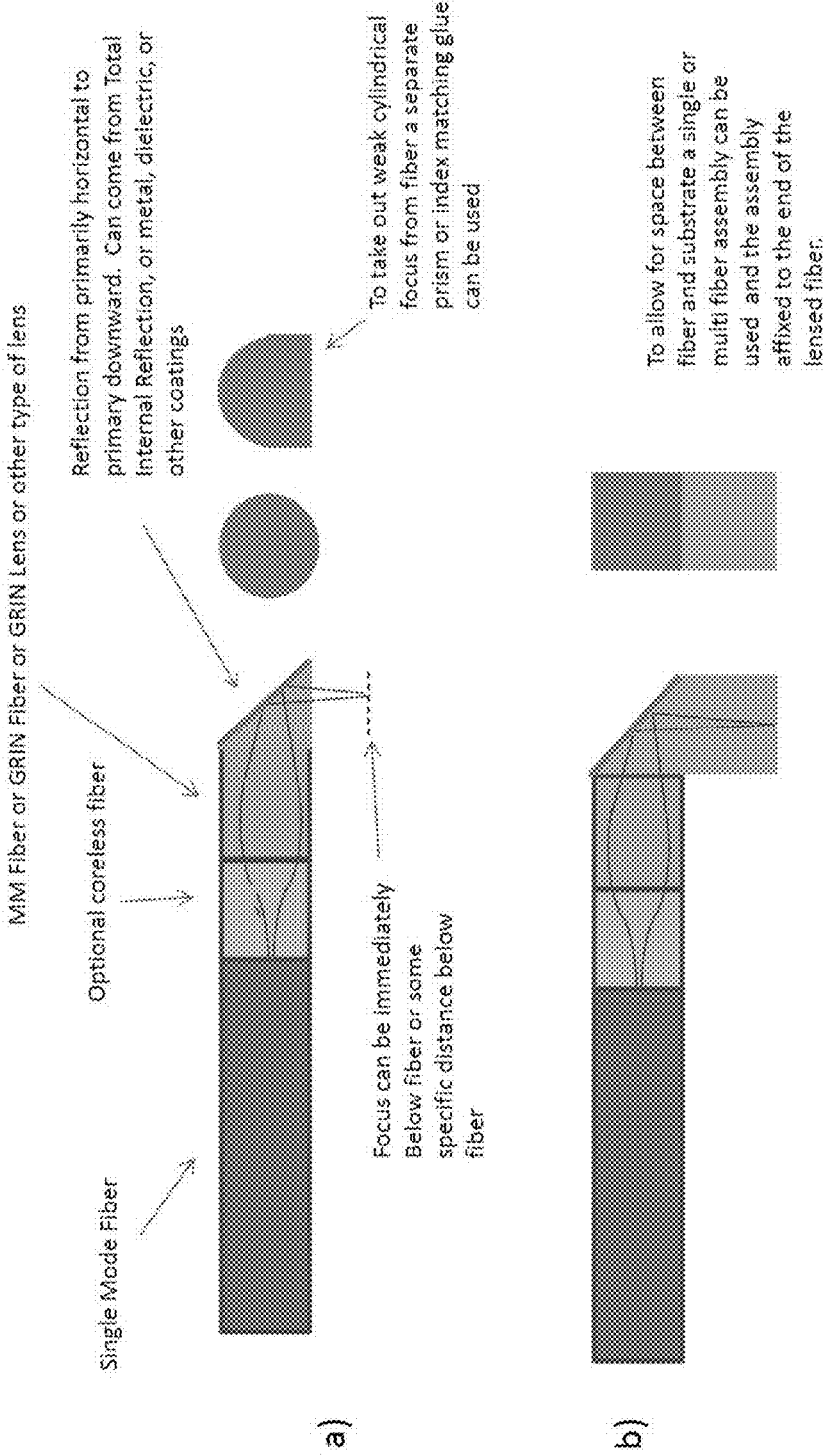
FIGS. 6(a) and 6(b) show a schematic configurations of a fiber lens affixed to a single mode fiber and a turning mirror that redirects light away from the axis of the single mode fiber according to an aspect of the present disclosure.

Turning now to FIGS. 6(a) and 6(b), there it shows an exemplary configuration according to an aspect of the present disclosure in which a lens is affixed to an end of an optical fiber along with a "turning mirror" that substantially redirects light from a path along the axis of the optical fiber. As may be appreciated, such a turning mirror may be made by a variety of methods and techniques including polishing an HR coating a small section of coreless fiber; affixing or otherwise positioning a prism on an end of a fiber (for example—at end of fiber lens); placing a fiber in a prefabricated groove (v-shaped or other) wherein the prefabricated groove includes an integrated turning mirror.

Advantageously, when a lens is employed, such a lens may be configured to focus light at a beam waist immediately below or at another specified distance as depicted schematically in FIG. 6(a). Alternatively, and as shown schematically in FIG. 6(b), the fiber may be affixed to an HR coated prism and a lens configured to focus light at the base of the prism. According to yet another aspect of the present disclosure, if a waveguide grating coupler (not shown) is positioned on a photonic integrated circuit at a position adjacent to the base of the prism, the resulting overall configuration exhibits a much lower profile than may be achieved by simply employing "bent" optical fibers.

As depicted in FIG. 6(a) and FIG. 6(b), light is reflected from a substantially horizontal path to a vertical, downward one. Those skilled in the art should readily appreciate that this disclosure is not so limiting in that the particular direction is not limited to a horizontal-to-vertical transition. More particularly, a vertical-to-horizontal redirection or intermediate orientations thereof are contemplated depending upon particular packaging and/or configurations.

As may be further observed, an optical fiber—in this instance a single mode fiber—is affixed to a section of an optional coreless fiber which in turn is affixed to a lens (i.e., multi-mode fiber or graded-index-fiber (GRIN) or GRIN lens or other) which redirects the light to a focal point which may be immediately below the fiber assembly or some other distance below. Advantageously, a separate prism or index-matching adhesive may be employed to eliminate any weak cylindrical focus resulting from the optical fiber. Still further, a space between the fiber assembly and an underlying substrate may be achieved by employing a single or multi-fiber assembly affixed to the end of the lensed fiber as depicted in FIG. 6(b).

Figure 7:
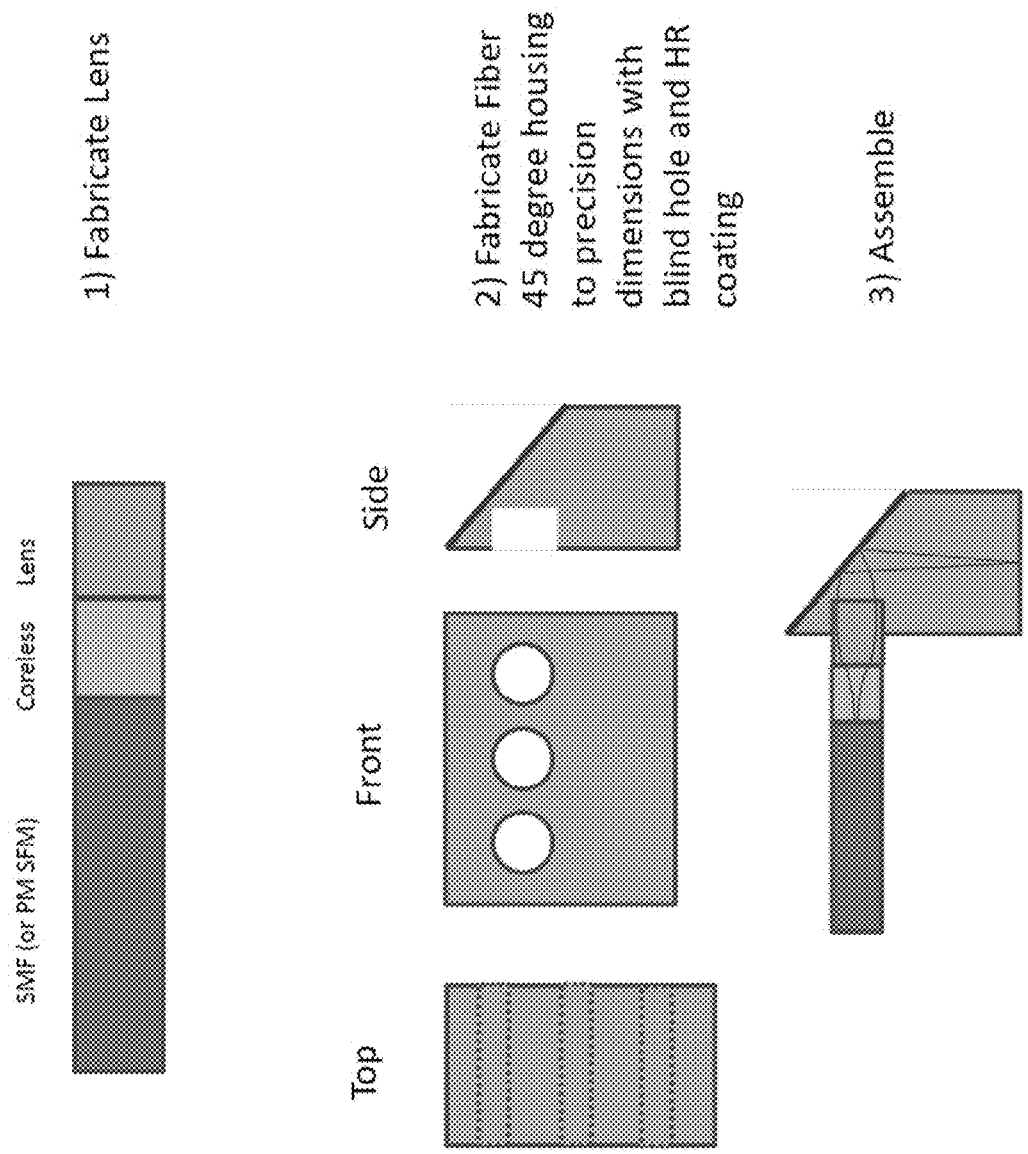
FIG. 7 shows a schematic configuration of an optical mechanical assembly that may be used to affix three single mode fibers containing integrated lenses, and redirect light using a single turning mirror, wherein the light is redirected toward the bottom of the assembly and focused onto or near the bottom surface according to an according to an aspect of the present disclosure.

FIG. 7 shows a series of schematic diagrams in which multiple fibers (three in this example) each are configured with lenses and secured into a three-fiber housing. As may be appreciated, the securing of the fibers to a housing may be accomplished through the use of a UV curable adhesive or other known methods. As shown in this Figure, the 3 fiber housing has three precision holes slightly larger than the diameter of the optical fibers and includes an HR coating and fold mirror. The lenses are configured to focus light at the base of the 3 fiber housing. As may be appreciated, such a multi-fiber housing has manufacturing characteristics that are advantageous for photonic integrated circuits which require the coupling of multiple fibers to one or more grating couplers. More particularly, the lens/fiber assembly may be fabricated and then combined with the housing to produce an overall configuration.

Figure 8:
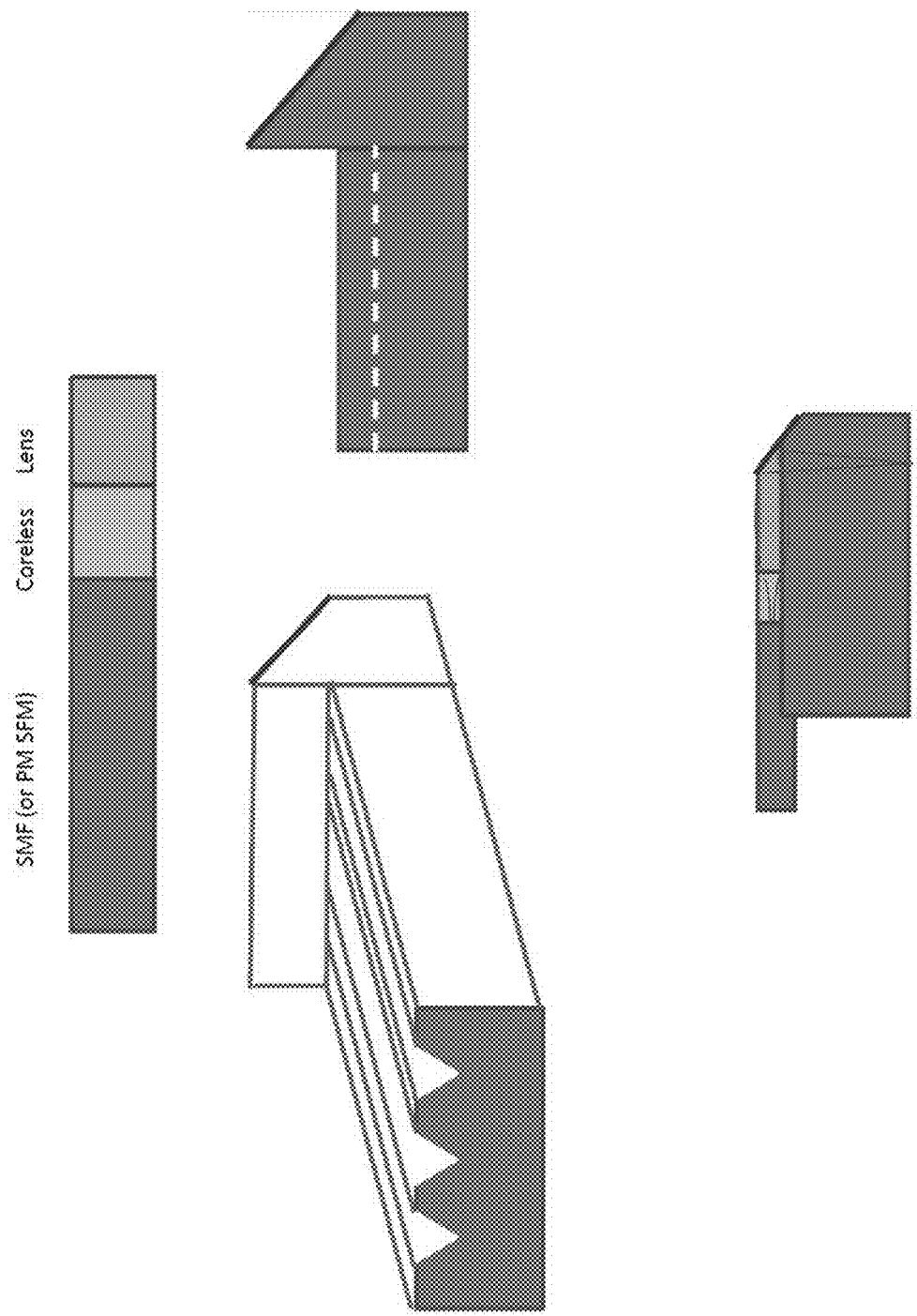
FIG. 8 shows a schematic configuration of three fiber v-groove assembly that includes a turning mirror according to an aspect of the present disclosure.

FIG. 8 shows another optical configuration according to another aspect of the present disclosure. More specifically FIG. 8 shows a 3-fiber, v-groove assembly including an integrated fold mirror which be combined with three separate micro-lensed optical fibers, i.e., single mode fibers. As may be understood, fibers may be first lensed and then affixed using UV or other curable adhesives or other techniques and/or materials. The 3-fiber v-groove assembly may be prepared by etching, injection molding, or other techniques. As may be further appreciated, an advantage of the configuration shown in FIG. 8 is that there is a large contact area between fiber(s) and grooves such that fiber alignment is enhanced. Additionally, through the use of index-matching liquid or adhesive (i.e., epoxy) the reflection produced at the surface between the fiber lens and the v-groove assembly may be minimized. Still further, it is possible to configure an angled interface such that any reflections are not coupled back into the light guide.

Figure 9:
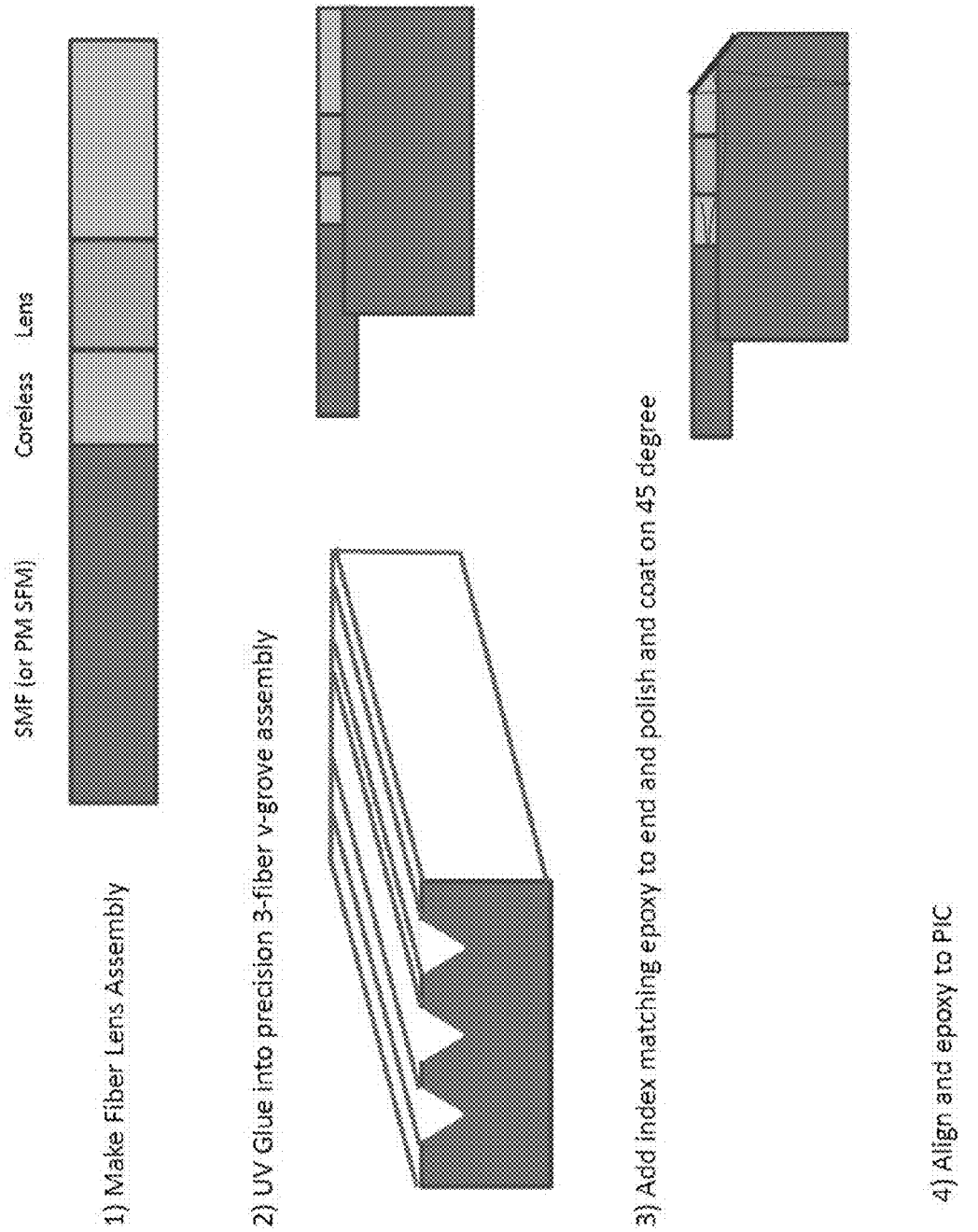
FIG. 9 shows a schematic configuration of another three fiber v-groove assembly according an aspect of the present disclosure.

FIG. 9 depicts yet another embodiment and method of making a fold mirror configuration according to an aspect of the present disclosure. More particularly—in this exemplary configuration—lensed fibers which may optionally include sections of coreless fibers are placed and affixed into a v-groove assembly using UV curable or other adhesives and/or techniques. The assembly is polished at a suitable angle (i.e., 45 degrees or other desired angle) to be compatible (i.e., match) with one or more grating coupler characteristics. The polished face may be advantageously HR coated or total internal reflection may be utilized as necessary.

Figure 10:
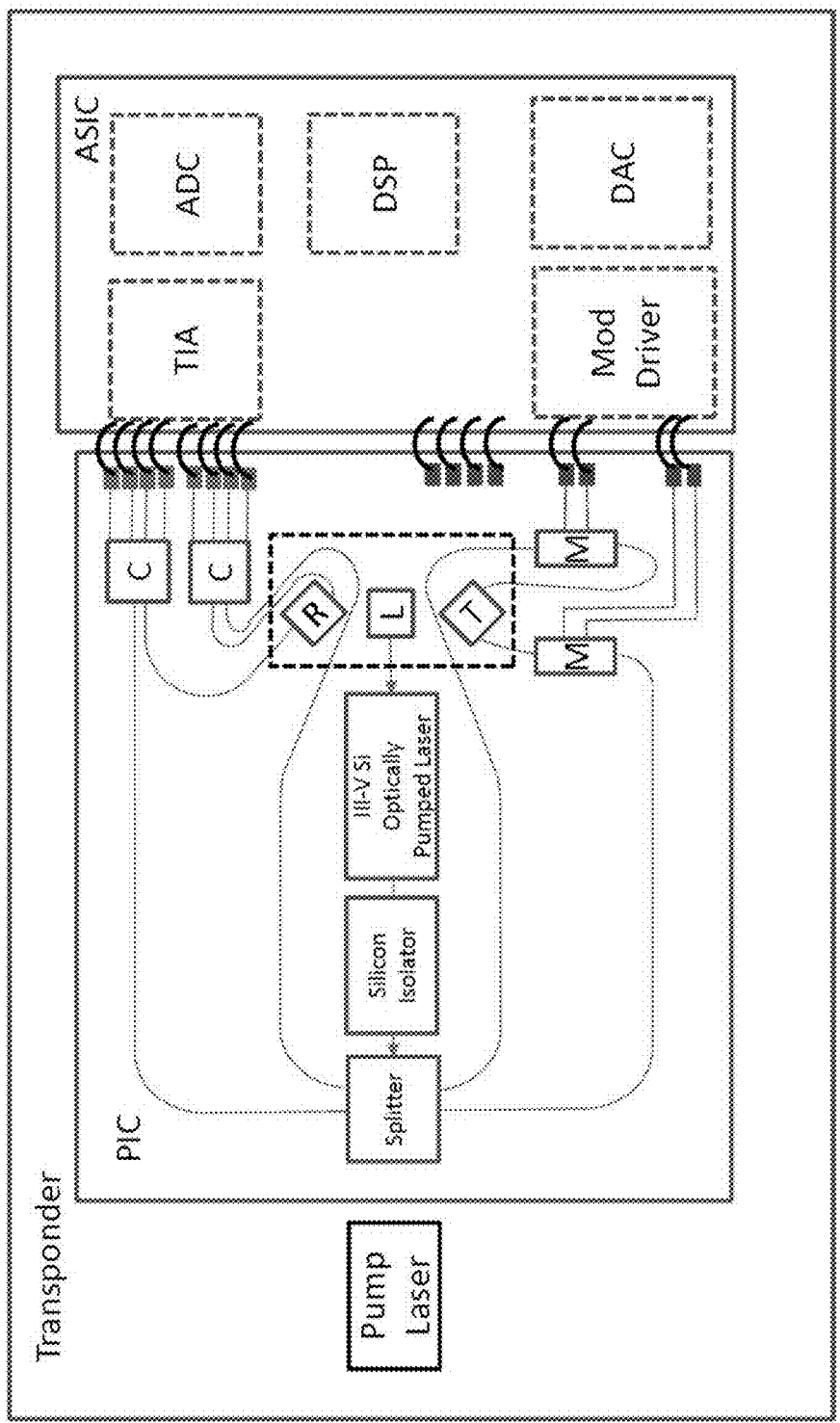
FIG. 10 shows a schematic configuration of an example optical transponder according to an aspect of the present disclosure.

With these coupling principles and techniques according to the present disclosure described, we turn to FIG. 10 that shows a schematic diagram of an optical transponder for optical fiber communications including dual polarization transmission and dual polarization coherent reception. As may be observed, the transponder includes multiple mechanical, electrical, and optical elements including a pump laser, a photonic integrated circuit (PIC) having three waveguide grating couplers (R, L, T) and an Application Specific Integrated Circuit (ASIC).

As is known, there exist a variety of PIC structures that may include multiple grating couplers such as those shown. As shown however—and purely exemplary—the configuration shown operates as follows. Light from a pump laser (e.g., 980 or 1480 nm) is coupled to grating coupler L via fiber pigtail affixed into a three-fiber block assembly such as that shown previously—and in particular FIG. 8. In an alternative embodiment—not specifically shown—there is no laser or silicon isolator and the light coupled into L is not pump light rather it is the same light that is transmitted. A receive optical fiber from a fiber optical network is affixed to one of the outer receptacles of a 3-fiber block assembly and coupled into R, and the transmitter optical fiber is affixed to another receptacle and coupled to grating waveguide coupler R (see, for example FIG. 7.) The PIC is designed and configured in a manner such that the three waveguide grating couplers are aligned such that when the 3-fiber block assembly is placed over the PIC the light is efficiently coupled from the fibers to/from the grating couplers.

As may be appreciated, the dotted outline around the R, L, and T couplers indicate where, for example, the 3-fiber block (FIG. 8) may be positioned in the structure of FIG. 10. Further, a variety of passive and active alignment techniques may be utilized to secure such a 3-fiber block assembly such as fiducials positioned on the PIC and monitoring power coupling efficiency as the 3-fiber block is aligned with the gratings.

Figure 11:
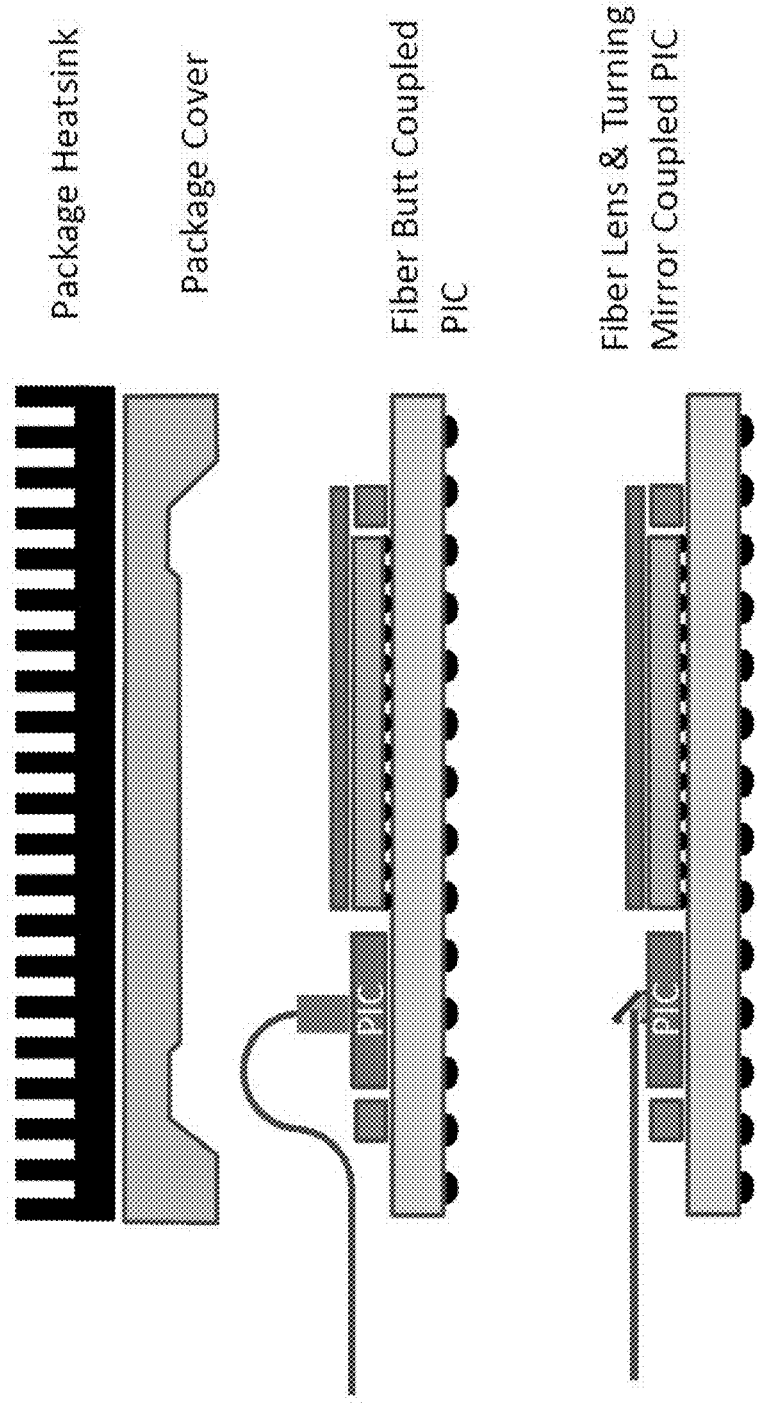
FIG. 11 shows a schematic of a photonic integrated circuit co-packaged with an ASIC employing two approaches: a fiber butt coupled approach and a fiber lens and turning mirror approach according to an aspect of the present disclosure.

FIG. 11 shows an example PIC co-packaged with an ASIC according to yet another aspect of the present disclosure. As those skilled in the art will readily appreciate, an ASIC can consume a large quantity of power and therefore it is challenging to co-package a PIC with an ASIC. Accordingly, above the ASIC is positioned a heat spreader and the ASIC is flip-chop mounted with die bonds to connect with a substrate. On a back side of the ASIC is positioned a heat spreader that contacts the package cover which is in close thermal contact with an optical heat sink. As may be readily understood, if a prior art approach of simply butt coupling an optical fiber to the PIC is employed in such a configuration then "overhead" space is a problem and an undesirable fiber bend radius will result. Accordingly, configurations and structures such as those shown and described previously will permit a lower profile wherein the ASIC cover and heat sink can be attached without excessive overall package height. Still further, additional overhead space may be realized in that a substrate may be recessed slightly below the PIC and the PIC and ASIC may be directly wire bonded or the PIC may include through silicon vias that connect to the substrate. Alternatively, the PIC may be flip-chop mounted and an area below the gratings may be made thinner such that it accepts the 3 fiber block assembly as described herein.

Those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. An apparatus comprising:
a groove assembly having a first surface having first and second grooves formed therein and a second surface substantially opposite the first surface;
a first optical fiber disposed within the first groove of the groove assembly and a second optical fiber disposed within the second groove of the groove assembly, the first optical fiber having a length defining an axis of propagation of light therein; and
an optical integrated circuit having a first surface on which is disposed an optical grating coupler, the first surface of the optical integrated circuit being proximate the second surface of the groove assembly and distal the first surface of the groove assembly;
a section of coreless fiber mechanically connected to an end of the first optical fiber and disposed within the first groove;
a lens mechanically connected to the section of coreless fiber such that the section of coreless fiber is disposed between the first optical fiber and the lens, and
an optical element mechanically connected to the lens and disposed such that the lens is between the first optical fiber and the optical element the optical element being configured such that light traveling along the axis of propagation within the first optical fiber is deviated toward the optical grating coupler, the optical element having an exit surface disposed between the first surface of the optical integrated circuit and a bottom surface of the first groove of the groove assembly;
wherein the optical element is shared by the first optical fiber and the second optical fiber.

2. The apparatus according to claim 1 wherein the optical grating coupler has a top surface that is within a Rayleigh range from the exit surface of the optical element.

3. The apparatus according to claim 2 wherein the optical grating coupler is chirped.

4. The apparatus according to claim 1 wherein the lens is a ball lens.

5. The apparatus according to claim 4, wherein the ball lens comprises a mirror, wherein the mirror is tilted so as to form at least one angle with respect to the axis of propagation of light that is not 90 degrees.

6. The apparatus according to claim 1, wherein the first surface of the optical integrated circuit is in contact with the exit surface of the optical element.

7. The apparatus according to claim 1 wherein the lens is a graded index fiber.

8. The apparatus according to claim 1, wherein the optical element comprises at least one reflective surface.

9. The apparatus according to claim 1, wherein an optical ray exiting the optical element through the exit surface of the optical element forms an angle with respect to a normal to the first surface of the optical integrated surface that is greater than zero.

10. The apparatus according to claim 1, wherein the optical element comprises an index matching adhesive.

11. The apparatus according to claim 1, wherein the first groove of the groove assembly is a V-groove.

12. The apparatus according to claim 1, wherein the lens is disposed in the first groove.

13. The apparatus according to claim 1, wherein the optical element is disposed at least partially within the first groove.

14. The apparatus of claim 1, wherein the first optical fiber, section of coreless fiber, lens, and optical element in combination define an optical conduit.

15. The apparatus of claim 1, wherein the optical element is coupled to the groove assembly.

16. The apparatus of claim 1, further comprising an Application Specific Integrated Circuit (ASIC), wherein the optical integrated circuit is co-packaged with the (ASIC).

17. The apparatus of claim 1, wherein the optical integrated circuit comprises a dual polarization transmitter.

18. The apparatus of claim 1, wherein the optical integrated circuit comprises a coherent receiver.

19. The apparatus of claim 1, wherein the first optical fiber and the second optical fiber are single mode fibers.

20. The apparatus of claim 1, wherein the first optical fiber, section of coreless fiber, lens, and optical element are positioned relative to the optical grating coupler such that light emitted from the optical element produces a light spot size on the optical grating coupler that is smaller than a spot size of the light within the first optical fiber.

* * * * *